United States Patent
Lee et al.

(10) Patent No.: US 11,876,820 B2
(45) Date of Patent: Jan. 16, 2024

(54) SECURITY INFORMATION VISUALIZATION DEVICE, SECURITY INFORMATION VISUALIZATION METHOD, AND STORAGE MEDIUM FOR STORING PROGRAM FOR VISUALIZING SECURITY INFORMATION

(71) Applicant: KOREA INSTITUTE OF SCIENCE & TECHNOLOGY INFORMATION, Daejeon (KR)

(72) Inventors: Younsu Lee, Daejeon (KR); Jungsuk Song, Sejong-si (KR); Sangsoo Choi, Sejong-si (KR); Kyuil Kim, Daejeon (KR); Hyeakro Lee, Daejeon (KR); Taewoong Kwon, Daejeon (KR); Harksoo Park, Daejeon (KR); Jinhyung Park, Daejeon (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 19 days.

(21) Appl. No.: 17/837,335

(22) Filed: Jun. 10, 2022

(65) Prior Publication Data
US 2022/0303298 A1    Sep. 22, 2022

Related U.S. Application Data

(63) Continuation of application No. PCT/KR2020/013245, filed on Sep. 28, 2020.

(30) Foreign Application Priority Data

Dec. 12, 2019    (KR) .................. 10-2019-0166138

(51) Int. Cl.
*H04L 9/40*    (2022.01)
*G06F 21/55*    (2013.01)

(52) U.S. Cl.
CPC .......... *H04L 63/1425* (2013.01); *H04L 63/20* (2013.01)

(58) Field of Classification Search
CPC . H04L 63/1425; H04L 63/20; H04L 63/1408; H04L 63/1416; G06F 21/316;
(Continued)

(56) References Cited

U.S. PATENT DOCUMENTS 9,762,599 B2 * 9/2017 Wager ................... G06F 21/577
10,904,277 B1 * 1/2021 Sharifi Mehr ...... H04L 63/1425
(Continued)

FOREIGN PATENT DOCUMENTS

JP    2002330177 A    11/2002
JP       4500921 B2     7/2010
(Continued)

OTHER PUBLICATIONS

Hanniel et al., "Information system log visualization to monitor anomalous user activity based on time," 2014 International Conference on Data and Software Engineering (ICODSE) Year: 2014 | Conference Paper | Publisher: IEEE.*
(Continued)

*Primary Examiner* — Roderick Tolentino
(74) *Attorney, Agent, or Firm* — Maier & Maier, PLLC

(57) ABSTRACT

A security information visualization method including the steps of: preprocessing log data extracted from a security device; calculating, from the pre-processed log data, periodic data of element information related to internet protocol (IP) address information about a security action; and providing visualization information visualizing the IP address information and the calculated periodic data of element information.

17 Claims, 5 Drawing Sheets

(58) Field of Classification Search
CPC .... G06F 21/56; G06F 21/577; G06F 11/3438; G06F 21/50
See application file for complete search history.

(56) References Cited

U.S. PATENT DOCUMENTS

| | | | |
|---|---|---|---|
| 10,924,503 B1* | 2/2021 | Pereira | H04L 63/20 |
| 2014/0237377 A1* | 8/2014 | Meissner | G06Q 30/02 715/745 |
| 2017/0257397 A1* | 9/2017 | Graham | H04L 63/1433 |
| 2017/0359384 A1 | 12/2017 | Banerjee et al. | |
| 2017/0366576 A1* | 12/2017 | Donahue | H04L 63/1416 |
| 2018/0091535 A1* | 3/2018 | Chroszieł | H04L 63/1425 |
| 2019/0086234 A1* | 3/2019 | Ranjan | B60H 1/00585 |
| 2019/0306011 A1* | 10/2019 | Fenoglio | H04L 41/16 |
| 2019/0306826 A1* | 10/2019 | Do | H04W 64/003 |
| 2022/0210115 A1* | 6/2022 | Hong | H04L 61/5007 |

FOREIGN PATENT DOCUMENTS

| | | |
|---|---|---|
| KR | 100748246 B1 | 8/2007 |
| KR | 1020110035582 A | 4/2011 |
| KR | 1020110037578 A | 4/2011 |
| KR | 101503701 B1 | 3/2015 |

OTHER PUBLICATIONS

Gupta et al., "Securing Virtual Infrastructure in Cloud Computing using Big Data Analytics," 2018 International Conference on Advances in Computing, Communication Control and Networking (ICACCCN) Year: 2018 | Conference Paper | Publisher: IEEE.*

International Search Report (with English Translation) and Written Opinion (with Machine Translation) dated Jan. 8, 2021, in connection with corresponding International Patent Application No. PCT/KR2020/013245; 18 pages.

Choi et al., "Overview of Research Activities in KISTI", 7th KISTI-NICTISCH Joint Security Workshop, Haevichi Resort Jeju, Korea, Oct. 7-10, 2019, (pp. 1-18).

* cited by examiner

SECURITY INFORMATION VISUALIZATION DEVICE, SECURITY INFORMATION VISUALIZATION METHOD, AND STORAGE MEDIUM FOR STORING PROGRAM FOR VISUALIZING SECURITY INFORMATION

FIELD

The following disclosure relates to a security information visualization device, a security information visualization method, and a storage medium for storing a program for visualizing security information.

BACKGROUND

Security log information recorded in a security device is important cyber security information for allowing or blocking an access action to enter a network that is a security management target. However, analysis of the security log information is a field that requires expertise in areas such as digital forensics, and thus has been regarded as an area managed after a security attack, such as an analysis of an infringement caused by a cyber attack.

That is, when a cyber security incident occurs, the security log information is used to analyze the cause and attack location of the security incident. However, it cannot be used for regular monitoring.

Therefore, security log data should be analyzed within a short period of time in order to quickly prevent or respond to infringement incidents caused by cyber attacks before cyber security incidents take place.

In addition, there is not analysis system that can be used for even a security administrator who lacks expertise in security log data to identify and respond to incidents in a short time through security information.

In particular, the security log data is in text format, and thus it is not easy to analyze an action suspected of a cyber attack or identify the cyber attack based on the security log data.

SUMMARY

An object of the embodiments disclosed below is to provide a security information visualization device, a security information visualization method, and a storage medium for storing a program for visualizing security information by which a cyber security incident and an action suspected of an attack may be quickly monitored when the security incident occurs.

Another object of the embodiments disclosed below is to provide a security information visualization device, a security information visualization method, and a storage medium for storing a program for visualizing security information that may be utilized for quick identification of and response to an incident through security information by even a security administrator who lacks expertise in security log data.

Another object of the embodiments disclosed below is to provide a security information visualization device, a security information visualization method, and a storage medium for storing a program for visualizing security information by which an action suspected of a cyber attack may be easily analyzed from security log data or a cyber attack may be easily identified.

Another object of the embodiments disclosed below is to provide a security information visualization device, a security information visualization method, and a storage medium for storing a program for visualizing security information that allow a user to visually determine presence of a security related dangerous action.

In one aspect of the present disclosure, embodiments may provide a method for visualizing security information, including preprocessing log data extracted from a security device, calculating period data of element information related to internet protocol (IP) address information about a security action based on the preprocessed log data, and providing visualization information obtained by visualizing the IP address information and the calculated period data of the element information.

The visualization information may list IP address information objects having a high degree of security related danger according to evaluation of danger in the IP address information.

The visualization information may periodically indicate at least one of the amount of log data of at least one IP address information object among the IP address information objects according to an inbound-allow policy of the security device, the amount of log data of the at least one IP address information object according to an inbound-deny policy, the amount of log data of the at least one IP address information object according to an outbound-allow policy, or the amount of log data of the at least one IP address information object according to an outbound-deny policy.

The visualization information may provide option information for a period of the period data.

The visualization information may provide search option information for searching for the IP address information.

The visualization information may include a relationship between a specific period unit and a log data amount for a time unit according to the specific period unit for a first IP address information object among the IP address information objects.

The visualization information provides a change in the amount of the log data over time for a specific periodic section or a specific aperiodic section in the period data.

The visualization information may provide a user with information about an IP address suspected of an attack according to a change in the amount of the log data.

In another aspect of the present disclosure, embodiments may provide a device for visualizing security information, including a data manager configured to preprocess log data extracted from the security device, an analysis manager configured to calculate period data of element information related to internet protocol (IP) address information about a security action based on the preprocessed log data, and a visualizer configured to provide visualization information obtained by visualizing the IP address information and the calculated period data of the element information.

In another aspect of the present disclosure, embodiments may provide a storage medium for storing a program for visualizing security information, the program being configured to preprocess log data extracted from a security device, calculate period data of element information related to internet protocol (IP) address information about a security action based on the preprocessed log data, and provide visualization information obtained by visualizing the IP address information and the calculated period data of the element information.

According to the embodiments disclosed below, when a cyber security incident occurs, the security incident and an action suspected of an attack may be quickly monitored.

According to the embodiments disclosed below, even a security administrator lacking expertise in security log data may use security information to quickly identify and respond to an incident.

According to the embodiments disclosed below, an action suspected of a cyber attack may be easily analyzed or the cyber attack may be easily identified from security log data.

According to the embodiments disclosed below, a user may obtain visualization information allowing the user to intuitively identify an abnormal action among traffics of a management system from the security log data.

DETAILED DESCRIPTION

Figure 1:
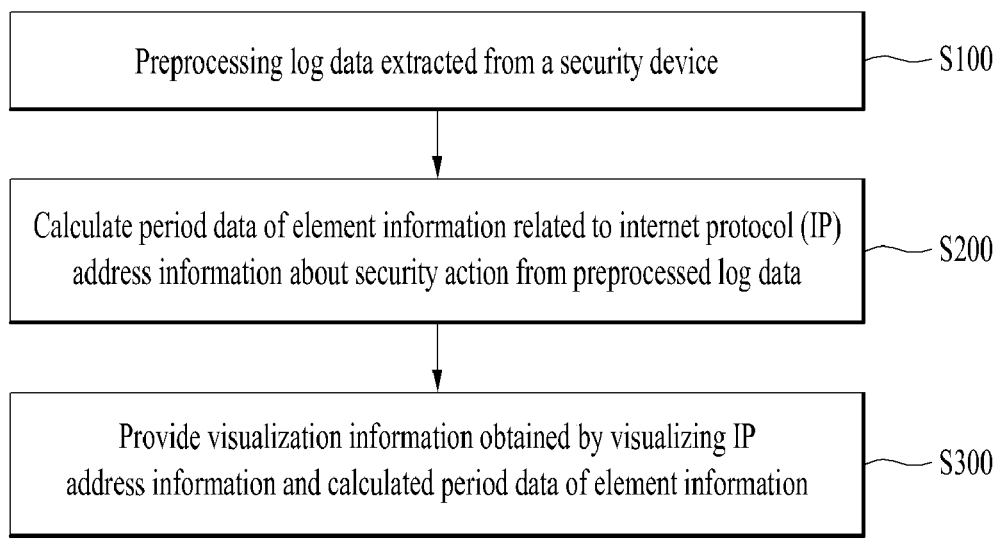
FIG. 1 is a diagram illustrating an embodiment of a security information visualization method.

FIG. 1 is a diagram illustrating an embodiment of a security information visualization method.

Log data extracted from a security device is preprocessed (S100).

For example, log data about an action requesting an access may be extracted from the security device such as a firewall.

The log data may include the following information.

For example, regarding an access action, the log data included in security information may include inbound action information about access to an internal network and outbound action information about access to an external network. The log data includes inbound access action data and outbound access action data.

The log data may include protocol information about an access action, such as, for example, a transmission control protocol (TCP) or a user datagram protocol (UDP).

The log data recorded in the security device may include data about a source internet protocol (IP) address, a destination IP address, and a port number for an action.

The security device may set a policy for each access action to allow or deny input/output for each action. Accordingly, the log data in the security information may include information for allowing input/output.

For each access action to the security device and each policy set in the security device, there may be actual input/output data that is sent to or received from a network.

Accordingly, the log data in the security information may include data about the number and size of packets sent through the security device, and data about the number and size of packets received through the device. The log data may include information about an active duration time related to the access action.

The log data extracted to visualize various kinds of analysis information from the log data is preprocessed.

Period data of element information related to the internet protocol (IP) address information about a security action is calculated from the preprocessed log data (S200).

The IP address information may be divided into internal IP address information and external IP address information based on the network protected by the security device.

Here, when log data is extracted, internal network IP address information based on the security device may be used. For example, statistical data of the security log information may be generated based on the internal network IP address information.

Various kinds of element information related to the internal network IP address information may be stored for analysis or used for time series analysis.

For reference, security devices such as a firewall have a very large amount of log data collected daily, and thus it is currently impossible to keep the data for a long period of time. Accordingly, period data of various kinds of element information in the log data may be calculated. In addition, the preprocessed log data may be stored for as long a period as possible for later analysis.

For example, the element information may include IP address information about a security related danger action, port information of the IP information about the security related danger action, protocol identification information related to the IP information about the security related danger action, or access policy information about the security device related to the security related danger target IP information.

In another aspect, the element information may include log data according to the inbound-allow policy, log data according to the inbound-deny policy, log data according to the outbound-allow policy, or log data according to the outbound-deny policy.

The log data information processed in this way may be used for an analysis, which will be described later.

Visualization information obtained by visualizing the IP address information and the calculated period data of the element information is provided (S300).

By analyzing the log data related to the internal IP address information, the degree of security danger may be calculated. Accordingly, the internal IP address information may be listed according to the degree of danger. For example, each piece of internal IP address information according to the degree of danger is represented as an IP address object.

According to an embodiment, visualization information may be generated according to the IP address objects. Also, when the degree of danger is recalculated, the arrangement of the IP address objects may be changed and provided to the user.

The visualization information may periodically indicate at least one of the amount of log data according to the inbound-allow policy of the security device, the amount of log data according to the inbound-deny policy, the amount of log data according to the outbound-allow policy, or the amount of log data according to the outbound-deny policy for at least one IP address information object among the IP address information objects.

The visualization information may provide the amount of log data for a specific IP address information object among the IP address information objects for a specific period unit and for each time unit according to the specific period unit.

The visualization information may provide a change in the amount of log data in the period data over time for a specific periodic section or a specific aperiodic section.

In addition, the visualization information may provide the user with information about information about an IP address suspected of an attack according to the change in the amount of log data.

Hereinafter, a detailed example of the visualization information and security information that a user may intuitively obtain will be described.

Figure 2:
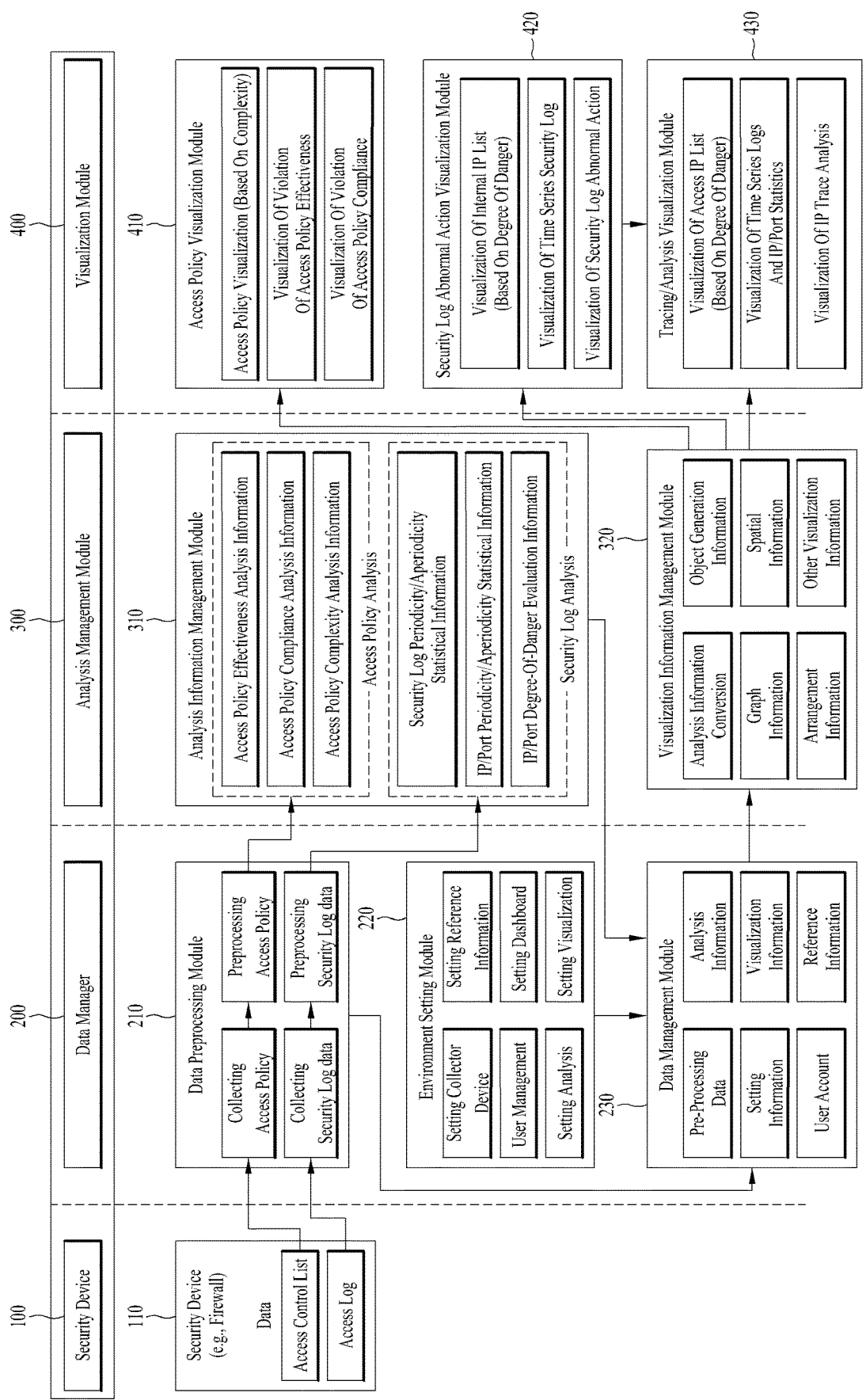
FIG. 2 is a diagram illustrating an embodiment of a security information visualization device.

FIG. 2 is a diagram illustrating an embodiment of a security information visualization device. An embodiment of the security information visualization device will be described with reference to this figure.

A security device 110 may store various data related to cyber security of the system. For example, the security device 110 may be a system such as a firewall. The security device 110 may store access log data for an access request for access to the system or store data such as an access control list according to a security policy.

The security device 110 may store raw data for visualizing security information.

A data manager 200 may include a data preprocessing module 210, an environment setting module 220, and a data management module 230.

The data preprocessing module 210 collects access policy information for data stored by the security device 110 or object information about the access policy, and preprocesses and outputs the information.

The data preprocessing module 210 collects security log information from the data stored by the security device 110, and preprocesses and outputs the same. The preprocessed data may be used to provide IP address information about security danger actions or to visualize tracing information about actions suspected of attacks.

The environment setting module 220 may perform various environment settings for the security information visualization device. The environment setting module 220 may set information about a collector device, information about reference information, and the like, and may set user management information, dashboard information, analysis information, and visualization-related information.

The user may set various environments of the security information visualization security device through the environment setting module 220, and may store and manage data as a whole under the set environment.

The data management module 230 may store and manage the data preprocessed by the data preprocessing module 210 and the setting information set through the environment setting module 220.

For example, the data management module 230 may store and manage information about user accounts, analysis information about multiple pieces of security information, or visualization information for the security information.

The data management module 230 may store and manage the analysis data processed by a analysis management module 300.

For example, the data management module 230 may receive, store, and manage access policy information or security log information processed by the analysis management module 300. The analysis management module 300 may receive access policy information or security log information stored in the data management module 230 and visualize the information.

For example, the data manager 200 may include a load balancer and a log collector in a system structure. The load balancer may be a transmission control protocol (TCP)/user datagram protocol (UDP) load balancer capable of distributing access requests for access to the security device 110.

The log collector collects and manages log data of the balanced load output by the load balancer.

For example, in terms of the system logic structure, the load balancer of the data manager 200 may receive system log data (Syslog raw data) according to an action of accessing the system, and separate and output a UDP data packet based on the load balancing configuration information (config data).

The data manager 200 may include a log collector. The log collector receives a UDP data packet from the load balancer, receives log data therefrom, and preprocesses and outputs the log data.

The data manager 200 may include an access policy collector. The access policy collector may receive security fire policy data of the security device, and preprocess and output the same.

The analysis management module 300 may include an analysis information management module 310 and a visualization information management module 320.

The analysis information management module 310 may analyze effectiveness of the access policy set in the security device 110 and appropriateness of the access policy based on the data stored in the security device 110, or may analyze the complexity of the access policy.

For example, the analysis information management module 310 may receive the access policy data processed by the data preprocessing module 210 and analyze whether the access policy is effectively set according to a method described below.

The analysis information management module 310 may receive the access policy data processed by the data preprocessing module 210 and analyze the compliance related to whether the access policy set in the security device 110 complies with the previously set policy.

The analysis information management module 310 may perform an analysis regarding whether the access policies set in the security device 110 are effectively set, whether there is any conflict between the access policies set in the security device 110, and whether the set access policies are excessively complex and are thus a burden on the system or the network/system to be secured, or whether simplification is necessary, based on the access control element information about the access policy processed by the data preprocessing module 210.

The analysis information management module 310 may analyze the security log data based on the data stored in the security device 310 and perform an analysis regarding whether the access request is a security danger based on the analyzed data.

For example, the analysis information management module 310 may analyze periodicity information or aperiodicity information about the security log data processed by the data preprocessing module 210, or periodicity/aperiodicity statistical information about IP address and port information included in the security log data. The analysis information management module 310 may analyze the security danger of the request for access to the system based on the analyzed statistical information.

Alternatively, the analysis information management module 310 may analyze a security related abnormal action or various access actions based on the security log data processed by the data preprocessing module 210 and provide information for tracing the abnormal action.

The analysis information management module 310 may provide the analyzed access policy information or security log information to the data management module 230 of the data manager 200.

The visualization information management module 320 may receive the analysis information stored in the data manager 200, convert the analysis information into visualization information or create an object related to visualization, and visualize the information according to the result of the operation.

The visualization information management module 320 may generate various types of visualization information by generating various graphs using the analyzed access policy data or the analyzed security log data and displaying or disposing security-related information in cyberspace.

The analysis management module 300 includes various storage devices in the system structure. The analysis management module 300 may include a real-time processor or analyzer configured to calculate data stored in the storage device in real time, and may store the calculated or analyzed data in the storage device or another storage device.

The data manager 200 may store, in the storage device, security policy data analyzed or statistically processed by the analysis management module 300 or the preprocessed log data.

For example, in terms of the system logic structure, the data analyzer of the analysis management module 300 may analyze the security policy data preprocessed by the data manager 200. The analysis management module 300 may include a cluster device. The cluster device may statistically analyze the log data preprocessed by the data manager 200.

The analysis management module 300 may store the analyzed access policy information or the analyzed security log statistical information in various storage media.

In addition, the analysis management module 300 may visualize the processed access policy data or security log statistical data, or the access policy data or security log statistical data stored in the data manager.

The visualization module 400 receives, from the visualization information management module 320, various visualization target data such as various types of analysis information, graph information about security analysis, security-related object information, cyberspace object information, and information about arrangement of information in cyberspace.

The visualization module 400 may include a module configured to visualize the various received visualization data. For example, the visualization module 400 may include an access policy visualization module 410 configured to visualize the analyzed access policy data, a security log abnormal action visualization module 420 configured to visualize an abnormal action based on the security log data, and a tracing/analysis visualization module 430 configured to trace the IP of an access action based on the security log data.

The access policy visualization module 410 may visualize the access policy based on the data analyzed by the analysis information management module 310 or the visualization information stored by the visualization information management module 320.

For example, the access policy visualization module 410 may visualize information about the complexity of the access policy set in the security device 110. The access policy visualization module 410 may visualize efficiency or effectiveness regarding, for example, whether there is a conflict between the access policies. Alternatively, the access policy visualization module 410 may visualize compliance information regarding, for example, whether there are any violations of security standards in the access policy and provide the visualized information to the user.

The user may obtain, from the access policy visualization module 410, visualization information from which the user may intuitively determine whether the access policy is effectively set in the security device 110.

The security log abnormal action visualization module 420 may generate visualization information about a security related abnormal access action based on the data analyzed by the analysis information management module 310 or the analyzed security log data stored by the visualization information management module 320, and provide the same to the user.

For example, the security log abnormal action visualization module 420 may visualize an internal or external IP address list based on the degree of danger in terms of security. The security log abnormal action visualization module 420 may visualize security log data in time-series and provide statistical information such as period information about the security log data to the user. Thus, the security log abnormal action visualization module 420 may visualize the security related abnormal action among the actions making an access based on the security log data, and provide the same to the user.

The user may obtain statistical information about the IP address of the security related abnormal action from the security log abnormal action visualization module 420 as intuitive visualization information.

The visualization information may list IP address information objects having a high degree of security danger in the IP address information according to degree-of-danger evaluation. The visualization information may provide option information about the period of the period data or provide search option information for searching for the IP address information.

The visualization information may include a relationship between a specific period unit and the amount of log data for a time unit according to the specific period unit for a specific IP address information object among the IP address information objects.

Such visualization information may enable the user to intuitively determine a security related abnormal action, and provide the user with information about an IP address suspected of an attack such that the information may be traced.

The tracing/analysis visualization module 430 may trace the IP information of an access action analyzed as a security related abnormal action and visualize the analyzed data, based on the data analyzed by the analysis information management module 310 or the visualization information stored by the visualization information management module 320.

For example, the tracing/analysis visualization module 430 may visualize the list of IP information about an action of an access request to the security device 110 based on the degree of danger of the action.

The tracing/analysis visualization module 430 may visualize the security log data and IP information and port information about the access request action, visualize data obtained by analyzing and tracing the IP information, and provide the data to the user.

The information visualized by the tracing/analysis visualization module 430 provides information about the amount of log data and the number of ports according to a time unit related to specific IP address information.

In addition, the visualization information provides identification information to the user when the amount of log data or the number of ports is greater than or equal to a threshold.

The visualization information provides first selection information for selecting log data for an inbound action of accessing an internal network or an outbound action directed to an external network in the log data.

The visualization information provides second selection information for selecting specific IP address information.

The visualization information includes the amount of log data of an access-allowed action of specific IP address information or the amount of log data of an access-denied action of the specific IP address information.

The visualization information may provide additional information about action information suspected of an attack according to a change in log data according to a specific duration related to the specific IP address information.

The visualization information may provide additional information about action information suspected of an attack according to service port information related to the specific IP address information.

In terms of the system logic structure, the visualization module 400 may include various user interfaces (UIs). For example, the visualization module may include a Web UI. The Web UI may visualize and provide access policy data analyzed by the access policy collector or access policy data stored after analysis for the user.

As another example, the visualization module 400 may include an application or unity UI. The application or unity UI may provide the user with security information visualized using statistical information.

The user may intuitively obtain tracing analysis information about the IP address classified as a security danger from the tracing/analysis visualization module 430.

The visualization module 430 provides the user with the visualization information disclosed below according to the user's request. The user may intuitively identify a problem with the access policy set in the security device 110 based on the visualization information and optimize the policy.

Figure 3:
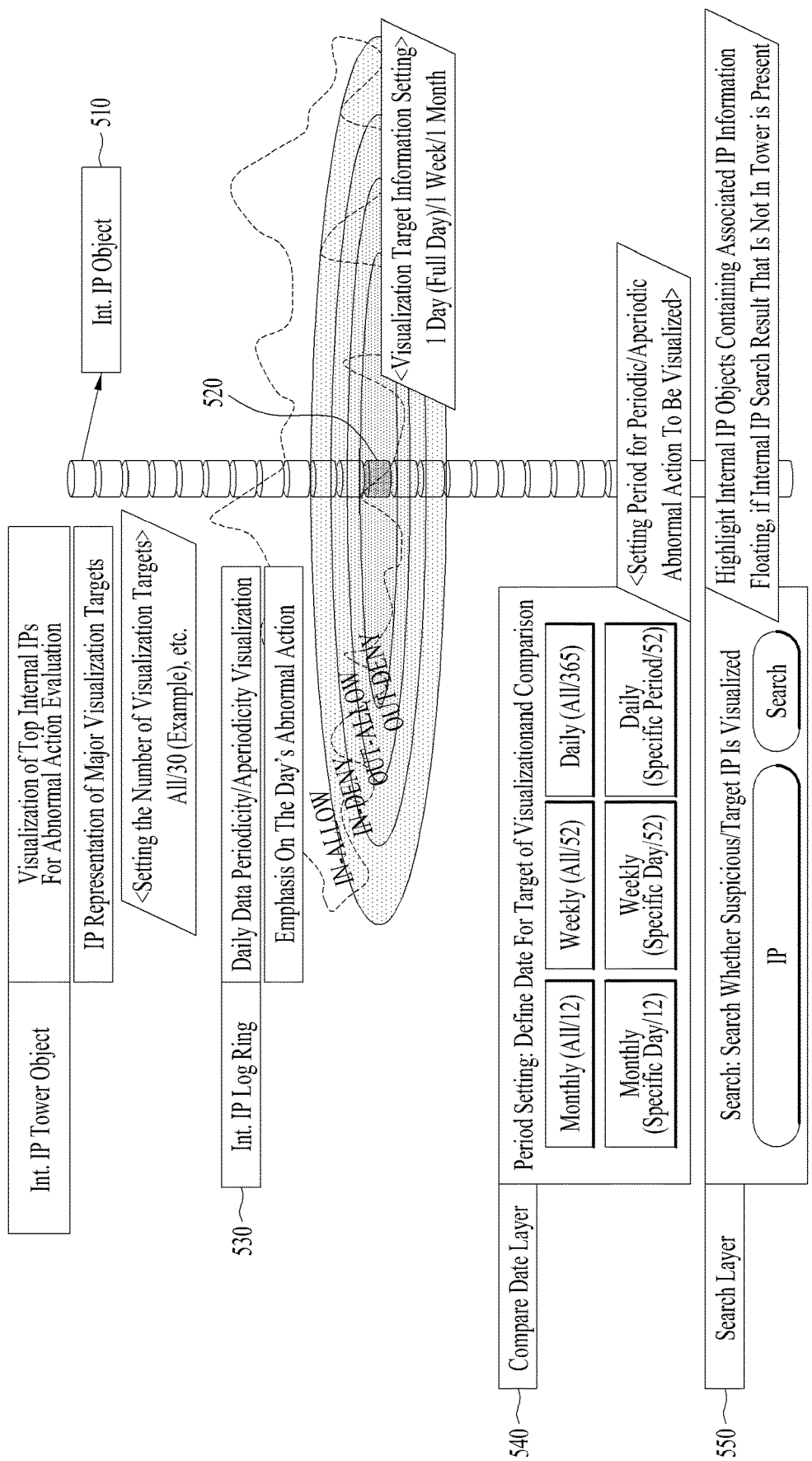
FIG. 3 is a diagram illustrating an example of visualization information that may be visualized according to an embodiment.

FIG. 3 is a diagram illustrating an example of visualization information that may be visualized according to an embodiment.

In this embodiment, visualization information may be presented for each IP address object having a high degree of danger according to IP address information, that is, IP address objects according to the degree of danger.

In this embodiment, an example of representing IP address objects having a high degree of danger in a tower-shaped center from top to bottom is disclosed.

According to the degree-of-danger evaluation, internal IP address objects 510 corresponding to IP addresses of actions with a high degree of security danger may be sequentially arranged from top to bottom. The user may set the number of IP address objects indicated in the visualization information according to selection. In this example, 30 IP address objects are set. The arrangement direction according to the order of degrees of danger may vary according to embodiments, and visualization information may be provided to allow the user to intuitively identify the IP address objects.

An example of the visualization information periodically indicate each of the amount of log data according to the inbound-allow policy, the amount of log data according to the inbound-deny policy, the amount of log data according to the outbound-allow policy, and the amount of log data according to the outbound-deny policy for a specific IP address object 520 for a certain duration. IN this example, the periodicity or aperiodicity of the security log data is visualized according to each direction and policy based on the daily log data.

For the information to be visualized, the certain duration may be set differently by the user.

The degree-of-danger evaluation is determined based on the periodicity or aperiodicity of each log data in the above statistical procedure for the amounts of log data. Accordingly, the visualization information may numerically indicate the number and frequency of periodicities or aperiodicities of log data and degrees of danger out of a threshold for a set duration.

For example, the periodicity or aperiodicity of log data may be calculated based on the degree of change in log data, the degree of change in the number of ports of actions related to the log data, the degree of change in log data produced in the network outside of business hours, and the degree of change in log data related to blocked actions, and the like. In addition, when a threshold is applied to the degree of change, it may be determined whether the degree of change is beyond the threshold with the periodicity or aperiodicity.

This example provides log ring information 530, which is ring-shaped information indicating the amounts of the log data for daily data.

The log ring object or log ring information 530 represents log data in a circular shape around the IP address objects 510 and 520. The circumferential direction of the log ring object or log ring information 530 may represent the set time information, and the vertical direction Y may represent the corresponding amount of log data.

In this example, the amount of log data according to the in-allow policy, the amount of log data according to the in-deny policy, the amount of log data according to the out-allow policy, and the amount of log data according to the out-deny policy are represented as corresponding outer circles centered on the IP address object 520.

A periodicity graph in circles for the amount of log data according to the in-allow policy, the amount of log data according to the in-deny policy, the amount of log data according to the out-allow policy, and the amount of log data according to the out-deny policy from an outer circle to an inner circle may be provided to the user.

When the amounts of the log data are periodically presented in a circular shape according to the specific IP address object 520 in this way, the user may intuitively recognize the characteristics of the periodicity or aperiodicity of the log data according to the direction of the access action and the set security policy.

The log ring object or log ring information 530 may provide summary information about the log data for a set duration according to four log types (in-allow, in-deny, out-allow, and out-deny).

The log ring object or log ring information 530 according to the type of each log may indicate analysis of periodicity or aperiodicity of each log data. For example, periodicity or aperiodicity information about the log data may be provided to the user by configuring a time interval showing periodicity or aperiodicity in a different color or shape.

The embodiment may set a specific duration for the exemplified visualization information. For example, a duration setting option 540 may allow the user to set a specific desired duration unit for visualization according to every day, every week, a specific date, a specific day, a specific arbitrary period, or the like.

According to the selection of the duration setting option 540, the log ring object or log ring information 530 may represent the amount of log data in the selected duration.

In addition, cube object information, which is periodicity information about detailed log data, may be provided according to the user's selection in order to provide a more detailed amount of log data for a set duration, and a detailed description thereof will be provided later.

The visualization information may provide a search option 550 to provide the periodicity/aperiodicity of the amount of log data related to the user's desired IP address separately from the IP address objects according to the degree of danger in the same manner as described above.

For an IP address object that is not provided through the visualization information, the user may obtain visualization information about the IP address object, using the search option 550.

Figure 4:
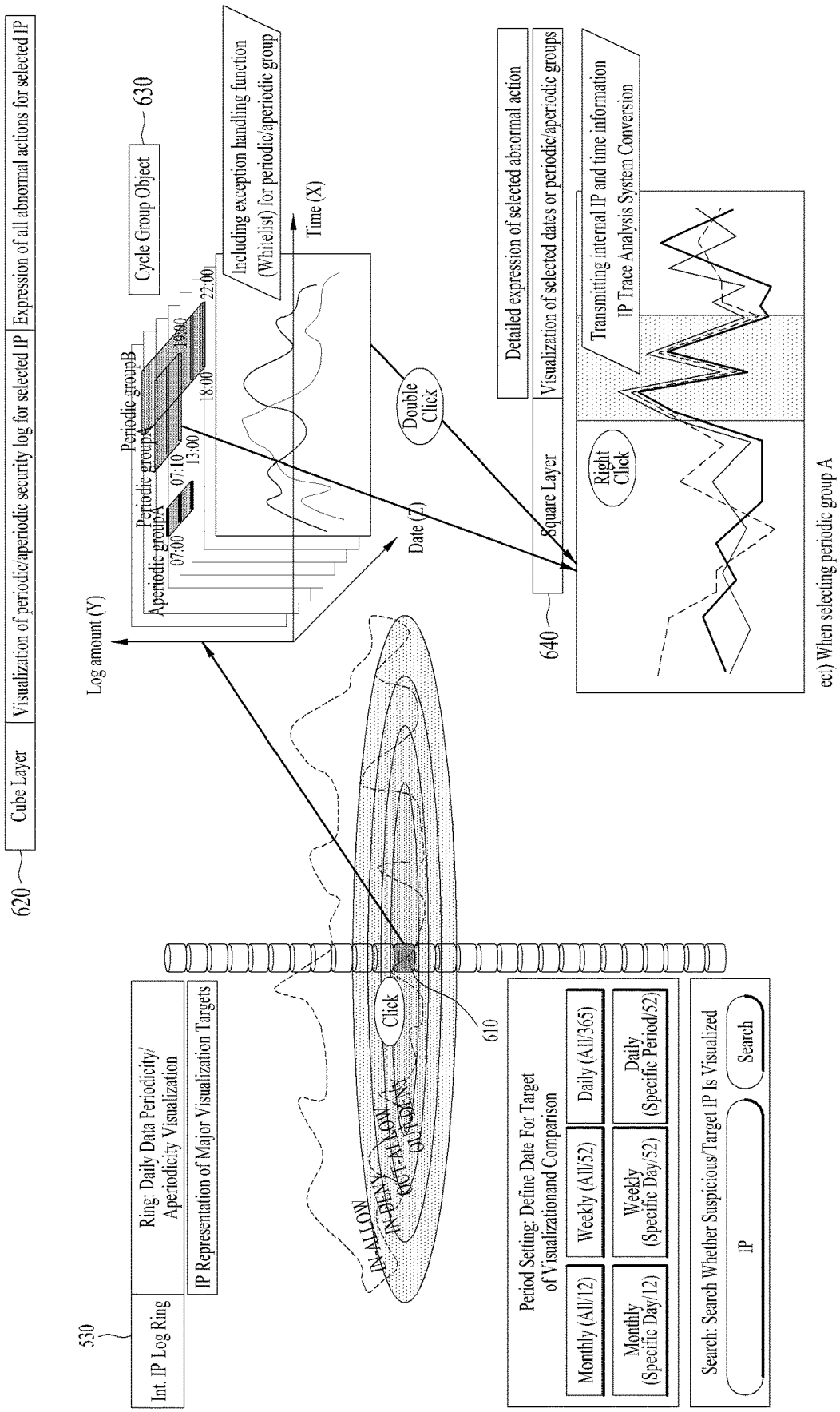
FIG. 4 is a diagram illustrating another example of visualization information according to an embodiment.

FIG. 4 is a diagram illustrating another example of visualization information according to an embodiment.

When a user selects a desired IP address object 610 in the visualization information described above, log amount data according to time for a certain duration of the selected IP address object 610 may be obtained.

In this example, when the user clicks on the specific IP address object 610, log data related to the selected IP address object may be presented as visualization information 620 as illustrated in the figure.

As an example of the visualization information 620, information for determining whether the log data of the specific IP address object 610 is periodic or aperiodic is provided.

Here, the example of the visualization information is presented for a specific duration Z of the amount of log data Y according to the time X of the specific IP address object 610, and is referred to as cube object information 620 for simplicity.

The cube object information 620 may represent detailed information about the amount of log data according to a log policy of a user-defined duration or a specific duration (e.g., 1 day, 1 week, 1 month, etc.). That is, a cube object may present, in a three-dimensional space, a relationship between the selected IP address information and the amount of log data Y in a unit of a specific duration Z according to a related time X.

For example, when the user wants to check a security danger or abnormal action related to the log data of every Monday for one year, the visualization information according to this embodiment provide the log data to the user by arranging the amount of the log data on Monday in each layer in the cube object information 620.

The amount of log data in a unit of a specific duration Z may be represented as 2D layers in the 3D visualization information 620. Here, the specific duration Z may be 1 day from Nov. 8, 2019 to Nov. 18, 2019.

The cube object information 620 may indicate periodicity or aperiodicity information about log data for a specific time X among the log data of the corresponding duration. Here, the periodicity or aperiodicity information about the log data for each specific time X is referred to as cycle group object information 630.

The cycle group object information 630 may provide the user with statistical similarity information of a unit time among the analysis target layers of periodicity or aperiodicity in the unit of the specific duration Z.

In this example, the cycle group object information 630 may bundle the layers of the similar periodicity or aperiodicity among the layers of the cube object information 620 and provide the same to the user as a periodic group A, B or an aperiodic group A.

Accordingly, when log data in a specific time zone changes periodically or aperiodically in a specific time unit Z, for example, by date, the cycle group object information 630 may provide information about the change.

The cycle group object information 630, which is bundle information about periodicity or aperiodicity information about the log data according to a specific time, includes groups representing periodic characteristics (periodic groups A and B) and a group representing aperiodic characteristics (aperiodic group A) according to each unit time.

According to the user's selection, the user may obtain periodicity or aperiodicity information about the log data for each time on a specific date in the cube object information 620. In this example, this information may be called information of a square layer 640.

In this example, when the user selects a specific part of the cube object information 620 or the specific cycle group object information 630 by double-clicking or the like, the amount of log data according to each hour on each selected date is provided.

When the user selects information of the square layer 640 in periodic group A, the amount of log data according to each hour on the selected date may be obtained.

When a time zone in which the amount of log data rapidly increases over time is selected, detailed statistical information about the log data may be provided to the user.

This example illustrates information of the square layer 640 that visualizes the log data periodically matching according to each hour on Nov. 11, Nov. 12, and Nov. 13, 2019.

When the user selects the shaded time region, statistical information may be more clearly identified in the selected time region of the IP address object. Thus, by tracing the access actions related to the IP address object, an attack action or a security danger action may be determined.

Figure 5:
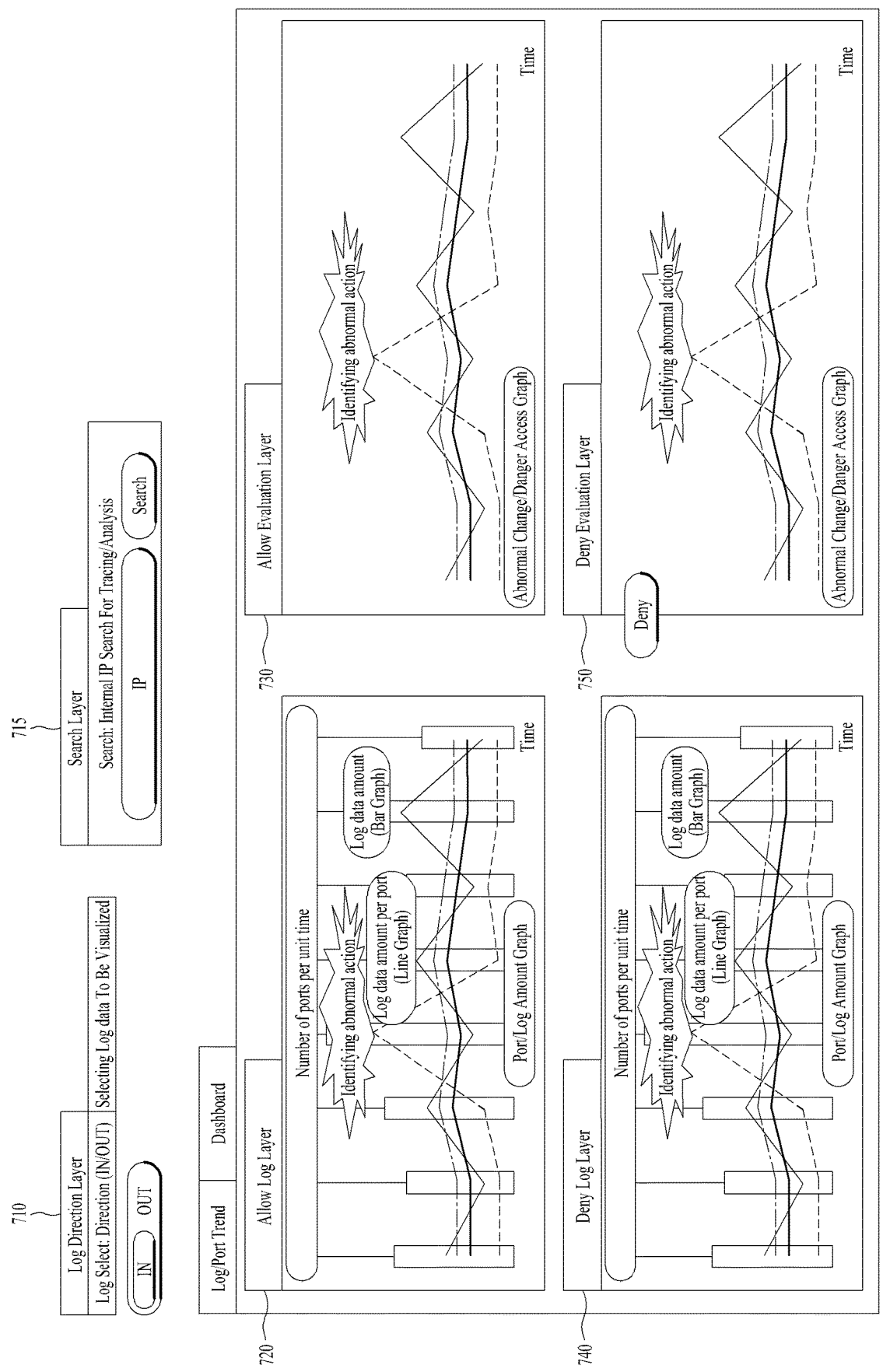
FIG. 5 is a diagram illustrating another example of visualizing and providing tracing information about an action suspected of an attack to a user based on log data.

FIG. 5 is a diagram illustrating another example of visualizing and providing tracing information about an action suspected of an attack to a user based on log data.

The figure illustrates an example of visualization information for tracing an action related to identification information when the identification information visualized as a security related abnormal action is selected in the previous figure.

Log data about an action of requesting an access may be extracted from a security device such as a firewall. The extracted log data may be preprocessed to generate visualization information.

Here, when the log data is extracted from the security device, internal network IP address information may be used based on the security device. For example, security log information may be processed based on the internal network IP address information.

For example, regarding access actions, the log data included in the security information may contain inbound action information for an access to an internal network and outbound action information directed to an external network. Therefore, the log data recorded in the security device includes inbound access action data and outbound access action data.

The security device may set a policy for each access action such that input/output is allowed or denied for each action, and the log data of the security information may include policy-related information.

Log data related to the internal network IP address information may include the following information.

The log data may include information on a destination IP address communicating with the internal IP address, a destination port communicating with the internal IP address, the amount of log data about the internal IP address, and the amount of log data according to the port number of the internal IP address. The log data may also include the amount of log data of an access allowed action for the internal IP address, the amount of log data of an access denied action for the internal IP address, the amount of inbound traffic log data, and the amount of outbound traffic log data.

In the visualization information according to the embodiment, the user may select log data related to an inbound action of accessing the network with specific IP address information and log data related to an outbound action directed to an external network with the specific IP address information.

The user may select log data according to an access action to be represented as visualization information, using a log direction option 710.

The user may select whether the desired visualization target log data is inbound data or outbound data for the secure network, using the log direction option 710 on the visualization information.

The user may obtain visualization information about a security related abnormal action exemplified below by searching the visualization information for specific IP address information through a search option 715.

The user may select input/output log data and IP address information using the log direction option 710 or the search option 715, and may be provided with the following visualization information according to the selected options.

In this example, the visualization information may include information 720 about log data about an allowed action, information 730 about whether the allowed action is dangerous, information 740 about log data about a denied action, and information 750 about whether the denied action is dangerous.

The information 720 about the log data about the allowed action may include information about the amount of log data related to specific IP address information for which access is allowed and information about the amount of log data for each port. In this example, the information about the amount of log data related to the specific IP address information is represented as a bar graph, and the information about the amount of log data for each port is represented as each line over time.

Based on the information 720 about the log data about the allowed action, the user may identify a security related abnormal action suspected of an attack (indicated as an abnormal action identification in the drawing).

The information 740 about the log data about the denied action may include information about the amount of log data related to the specific IP address information for which access is denied and information about the amount of log data for each port. Similarly, in this example, the information about the amount of log data related to the specific IP address information for which access is denied is represented as a bar graph, and the information about the amount of log data for each port is represented as each line over time.

Based on the information 740 about the log data about the denied action, the user may identify a security related abnormal action suspected of an attack.

The visualization information according to this example may include additional information for determining an abnormal action with respect to the information 720 for the log data about the allowed action, and may provide the user with information about whether the action is an abnormal action. Similarly, the visualization information according to this example may include additional information for determining an abnormal action for the information 740 for the log data about the denied action, and may provide the user with information about whether the action is an abnormal action.

Here, the additional information may include abnormal action evaluation information or dangerous access evaluation information, and the user may obtain more accurate information about the security related abnormal action through the additional information.

In this example, the abnormal action evaluation information for determining a security related abnormal action may include information about the IP address is IP address information with a history of access to a target network for a specific duration, and information about a port number with a history of access to the target network for the specific duration. For example, the visualization information provides additional evaluation information for determining an abnormal action according to a change in log data according to a specific duration related to the IP address information.

The abnormal action evaluation information may include additional information about, for example, whether the access is an access with an IP address without an access history in the last one month, whether the access is an access of an action with a port number that has no access history in the last one month, and whether the log data about an access action has increased beyond a specific threshold compared to the average statistics.

The abnormal action evaluation information may include additional information about, for example, whether the log data about the port number for the access action has increased beyond a certain threshold compared to the average statistics, whether the amount of log data generated outside of business hours has increased compared to the average statistics, and whether the allow/deny ratio of the log data about the access action has changed rapidly compared to the average statistics.

The dangerous access evaluation information, which is additional information for determining a security related abnormal action, means access to a service port that is known to be dangerous for security.

For example, the visualization information provides additional evaluation information for determining an abnormal action according to service port information related to IP address information.

For example, the dangerous access evaluation information includes information about the type or quantity of attack access service ports, information about the type or quantity of non-encrypted communication or transmission ports, information about the type or quantity of file sharing service ports, information about the type or quantity of database service ports, and IP address information in a pre-made blacklist.

Specific examples of the attack access service port may include remote desktop protocol (RDP) and virtual network computing (VNC). Examples of the non-encrypted communication or transmission port may include telnet or file transfer protocol (FTP). Examples of the file sharing service port may include Torrent.

In this figure, the visualization information provides time series statistical information 720 and 740 about the analyzed log data. Also, the example visualization information may provide abnormal action information 730 about the log data about an allowed action or abnormal action information 750 about the log data about a denied action by adding abnormal change evaluation information or dangerous access evaluation information.

The user may be provided with visualization information for intuitively identifying an abnormal action among traffics of the management system from the security log data.

MODE FOR DISCLOSURE

Various embodiments have been described in the best mode for carrying out the invention.

INDUSTRIAL APPLICABILITY

When a cyber security incident takes place, the security incident and an action suspected of an attack may be quickly monitored, accordingly may be quickly and efficiently coped with, which may be repeatedly implemented.

The invention claimed is:

1. A method for visualizing security information, comprising:
   preprocessing log data extracted from a security device;
   calculating period data of element information related to IP address information about a security action based on the preprocessed log data; and
   providing visualization information obtained by visualizing the IP address information and the calculated period data of the element information,
   wherein the visualization information lists IP address information objects in a row or line in a tower shape based on a degree of security danger which is determined by an evaluation of danger in the IP address information,
   wherein the method further comprises receiving a user input for selecting one of the IP address information objects,
   wherein, in response to the user input, the visualization information further displays a log ring object in a cylindrical shape around the selected IP address information object, a circumferential direction of the log ring object representing a set time information and a vertical direction of the log ring object representing a corresponding amount of the log data, and
   wherein the visualization information indicates a suspected attack on an IP address based on a degree of change in amount of the log data.

2. The method of claim 1, wherein the visualization information periodically indicates at least one of:
   an amount of log data of at least one IP address information object among the IP address information objects according to an inbound-allow policy of the security device,
   an amount of log data of the at least one IP address information object according to an inbound-deny policy,
   an amount of log data of the at least one IP address information object according to an outbound-allow policy, and
   an amount of log data of the at least one IP address information object according to an outbound-deny policy.

3. The method of claim 1, wherein the visualization information provides option information for a period of the period data.

4. The method of claim 1, further comprising receiving user input for searching the IP address information.

5. The method of claim 1, wherein the visualization information includes a relationship between a selected period unit and a log data amount for a time unit according to the selected period unit for the selected IP address information object.

6. The method of claim 1, wherein the visualization information provides a change in amount of the log data over time for a specific periodic section or a specific aperiodic section in the period data.

7. The method of claim 1, wherein when the log data comprises:
   information of a number and a size of packets sent and received through the security device, and
   information of an active duration time related to an access action,
   wherein statistical information of the log data is generated based on the IP address information.

8. The method of claim 1, wherein the element information comprises:
   the IP address information,
   a port information,
   a protocol identification information, and
   an access policy information, which are relevant to a security related danger action.

9. The method of claim 1, wherein the evaluation of danger is performed based on a periodicity or an aperiodicity of the log data in a statistical procedure for an amount of the log data, and
   wherein the visualization information numerically indicates a number or a frequency of the periodicity or the aperiodicity of the log data and a degree of security danger.

10. The method of claim 1, wherein a periodicity or an aperiodicity of the log data is calculated based on a degree of change in the log data, and the degree of change comprises:
    a change of ports of actions related to the log data;
    a change in the log data produced outside of a predetermined hour; and
    a change in the log data related to blocked actions.

11. A device for visualizing security information, the device comprising a processor and storage device and being configured to:
    preprocess log data extracted from a security device;
    calculate period data of element information related to IP address information about a security action based on the preprocessed log data; and
    provide visualization information obtained by visualizing the IP address information and the calculated period data of the element information,
    wherein the visualization information lists IP address information objects in a row or line in a tower shape based on a degree of security danger which is determined by an evaluation of danger in the IP address information,
    wherein the device is further configured to receive a user input for selecting one of the IP address information objects,
    wherein, in response to the user input, the visualization information further displays a log ring object in a cylindrical shape around the selected IP address information object, a circumferential direction of the log ring object representing a set time information and a vertical direction of the log ring object representing a corresponding amount of the log data, and
    wherein the visualization information provides a user with information about an IP address suspected of an attack according to a degree of change in amount of the log data.

12. The device of claim 11, wherein the visualization information provides a change in amount of the log data over time for a specific periodic section or a specific aperiodic section in the period data.

13. The device of claim 11, wherein the visualization information includes a relationship between a selected period unit and a log data amount for a time unit according to the selected period unit for the selected IP address information object.

14. The device of claim 11, wherein the device is further configured to receive user input for searching the IP address information.

15. The device of claim 11, wherein the visualization information provides option information for a period of the period data.

16. The device of claim 11, wherein the visualization information periodically indicates at least one of:
- an amount of log data of at least one IP address information object among the IP address information objects according to an inbound-allow policy of the security device,
- an amount of log data of the at least one IP address information object according to an inbound-deny policy,
- an amount of log data of the at least one IP address information object according to an outbound-allow policy, and
- an amount of log data of the at least one IP address information object according to an outbound-deny policy.

17. A non-transitory computer-readable storage medium for storing a program for visualizing security information, the program containing instructions for causing a computing device to:
preprocess log data extracted from a security device;
calculate period data of element information related to IP address information about a security action based on the preprocessed log data; and
provide visualization information obtained by visualizing the IP address information and the calculated period data of the element information,
wherein the visualization information lists IP address information objects in a row or line in a tower shape based on a degree of security danger which is determined by an evaluation of danger in the IP address information,
wherein the program further contains instructions which cause the computing device to process a user input received by the computing device for selecting one of the IP address information objects,
wherein, in response to the user input, the visualization information further displays a log ring object in a cylindrical shape around the selected IP address information object, a circumferential direction of the log ring object representing a set time information and a vertical direction of the log ring object representing a corresponding amount of the log data, and
wherein the visualization information provides a user with information about an IP address suspected of an attack according to a degree of change in amount of the log data.

* * * * *